H. DINGMAN.
AUTOMATIC STEERING DEVICE.
APPLICATION FILED JULY 23, 1919.

1,359,878.

Patented Nov. 23, 1920.
2 SHEETS—SHEET 1.

WITNESSES
Geo. V. Hall

INVENTOR
Henry Dingman
BY
ATTORNEYS

H. DINGMAN.
AUTOMATIC STEERING DEVICE.
APPLICATION FILED JULY 23, 1919.

1,359,878.

Patented Nov. 23, 1920.
2 SHEETS—SHEET 2.

WITNESSES
Geo. V. Hall

INVENTOR
Henry Dingman.
BY
ATTORNEYS

UNITED STATES PATENT OFFICE.

HENRY DINGMAN, OF WEST POINT, IOWA.

AUTOMATIC STEERING DEVICE.

1,359,878.

Specification of Letters Patent.

Patented Nov. 23, 1920.

Application filed July 23, 1919. Serial No. 312,687.

*To all whom it may concern:*

Be it known that I, HENRY DINGMAN, a citizen of the United States, and a resident of West Point, in the county of Lee and State of Iowa, have invented a new and useful Improvement in Automatic Steering Devices, of which the following is a specification.

This invention appertains to a class of device employed in connection with power-driven vehicles and is adapted to be employed more particularly in connection with tractors for use in drawing farm machinery.

The invention aims to provide a device which may be integral with the front axle, although I preferably provide what might be termed a supplemental axle to be attached to the steering axle for guiding the tractor, so that the same will work parallel to its last path of travel without the control of an operator, so that the operator upon the tractor is relieved of all except the minimum of attention to the tractor and may be in a position to adjust the working of the plows or other devices drawn by said tractor.

In the accompanying drawings.

Figure 1:
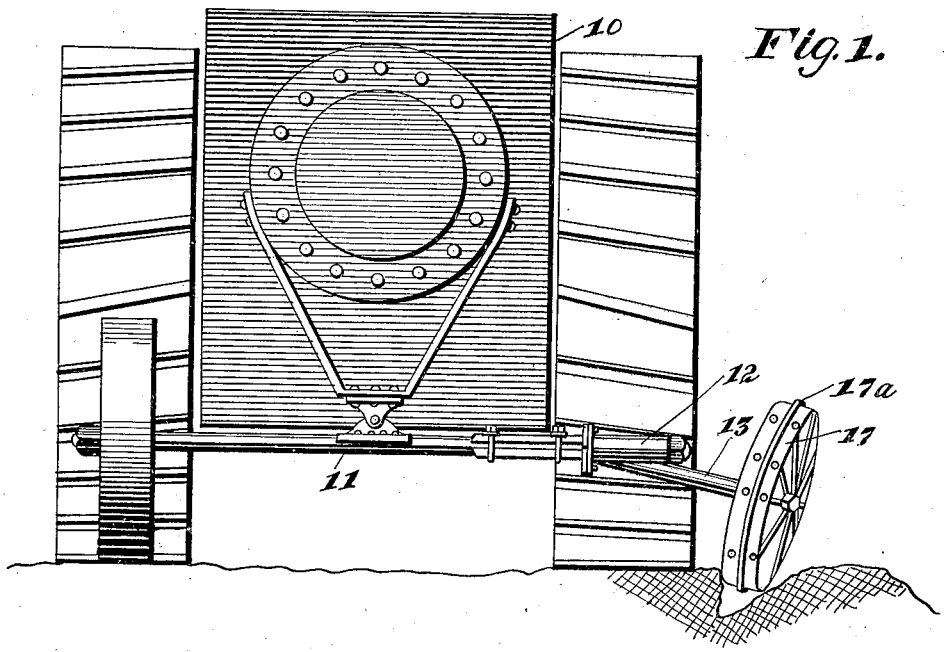
Figure 1 is a front elevation of a tractor illustrating the practical application of my application.
Figure 2:
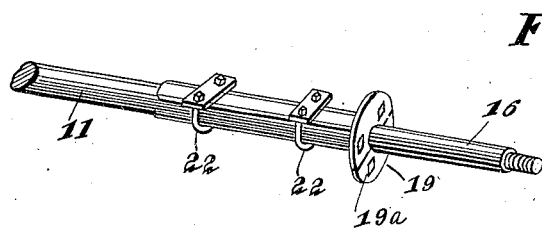
Fig. 2 is a perspective view of a portion of the front axle.
Figure 3:
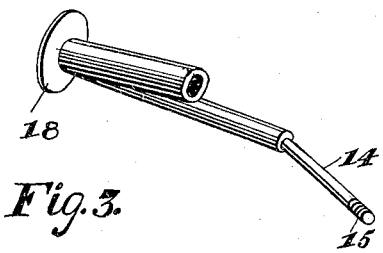
Fig. 3 is a detail perspective view of a supplemental axle section provided by my invention.
Figure 4:
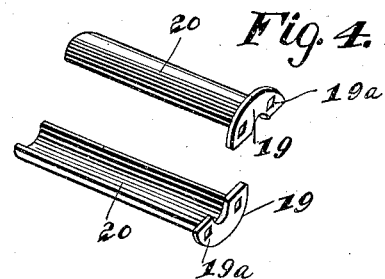
Fig. 4 is a similar view of the two portions of the clamp.
Figure 5:
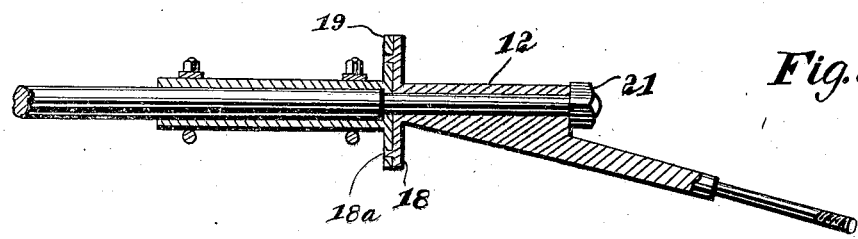
Fig. 5 is a longitudinal section through my improved device in position on the tractor axle.

Referring to these figures and particularly to Fig. 1, I have indicated a tractor generally at 10, the front axle of which appears at 11 and is provided, in accordance with my invention, with a supplemental axle section having a tubular cylindrical body 12 provided with an angular extension 13, projecting in the direction of the length of the body 12 beyond the outer end thereof, the extension terminating in a reduced angular spindle 14 which is inclined forwardly and downwardly and has terminal threads 15. The spindle of the supplemental axle section is, in practice, similar to the spindle 16 of the tractor axle 11, so as to enable detachment of one side wheel and disposition of the wheel upon the spindle of the supplemental axle section after the latter has been secured in operative position, although, as shown in Fig. 1, I have preferably utilized a wheel 17 which has a peripheral rib $17^a$ around the median line of its thread so as to insure its firm engagement with the ground.

It is thus to be seen in operation the attachment, including the supplemental axle section and the wheel 17 as applied to the steering axle of the tractor, and by which inclination of the supplemental spindle 14 will assume a position out of the vertical, whereby once the wheel is guided into a previously made furrow it will act to maintain the tractor along a movable course parallel to the previously made furrow, as seen in Fig. 1, and in this way obviate the necessity for constant attention of the operator to the matter of direction. This will permit the operator to concentrate more particularly upon the adjustment and maintenance of the plows or other implements the tractor may be engaged in drawing.

As seen in Figs. 1 to 5, inclusive, the supplemental axle section is preferably attached by virtue of an annular flange 18 at the inner end of its tubular body 12, arranged to abut the flange 19 of a pair of curved supporting members 20 said flanges 18 and 19 being secured in non-rotatable relation by relatively engaging lugs $18^a$ and recesses $19^a$. The supporting members 20 are disposed to partially embrace the axle 11 at a properly spaced point with respect to its spindle 16, the latter of which receives the body 12, and thus, when nut 21 is screwed upon the threaded end of the spindle 16 and the supporting members 20 are clamped by U-clamps 22 to the main axle 11, the supplemental axle section will be rigidly fastened in place.

Figure 6:
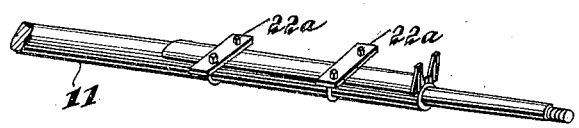
Fig. 6 is a perspective view of a portion of the driving axle illustrating a modified form of attachment.
Figure 7:
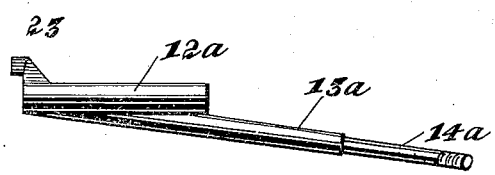
Fig. 7 is an elevation of the form of a supplemental axle section, according to the modification.
Figure 8:
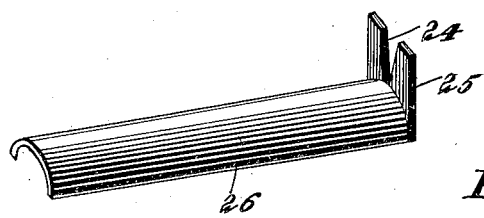
Fig. 8 is a detail perspective view of the support or clamp attached to the tractor axle, according to Figs. 6 and 7.

As seen in Figs. 6, 7, and 8, however, the body $12^a$ of the supplemental axle section, here illustrated, having an angular section $13^a$ and a spindle $14^a$, may be provided at its inner end with an offset lug 23 arranged to engage a V-shaped notch 24 of one flange end 25 of a supporting member 26, which, like the supporting members 20, partially embraces the axle 11, as seen in Fig. 6, and is secured by U-clamps 22ª. It will be understood that the spindle 14ª is inclined like the spindle 14 previously described and adapted to receive and support the wheel 17 in a like manner.

I claim:—

1. A steering device for a power driven vehicle steering axle including a supplemental spindle having means for detachably engaging one of the wheel spindles of the said axle when its usual wheel is removed, such spindle extending downwardly and forwardly and a wheel revolubly mounted upon the supplemental spindle.

2. The combination with the steering axle of a power-driven vehicle having a wheel spindle, of an attachment including a tubular body telescoping the said spindle when its wheel is removed, an anchor member secured on the axle adjacent to the spindle and with which the said body is engaged, a supplemental spindle carried by the body and depending in forwardly inclined relation therefrom, and a steering wheel on said supplemental spindle.

HENRY DINGMAN.